No. 851,799. PATENTED APR. 30, 1907.
A. CHURCHWARD.
ELECTRIC TRACTION SYSTEM.
APPLICATION FILED JUNE 1, 1906.
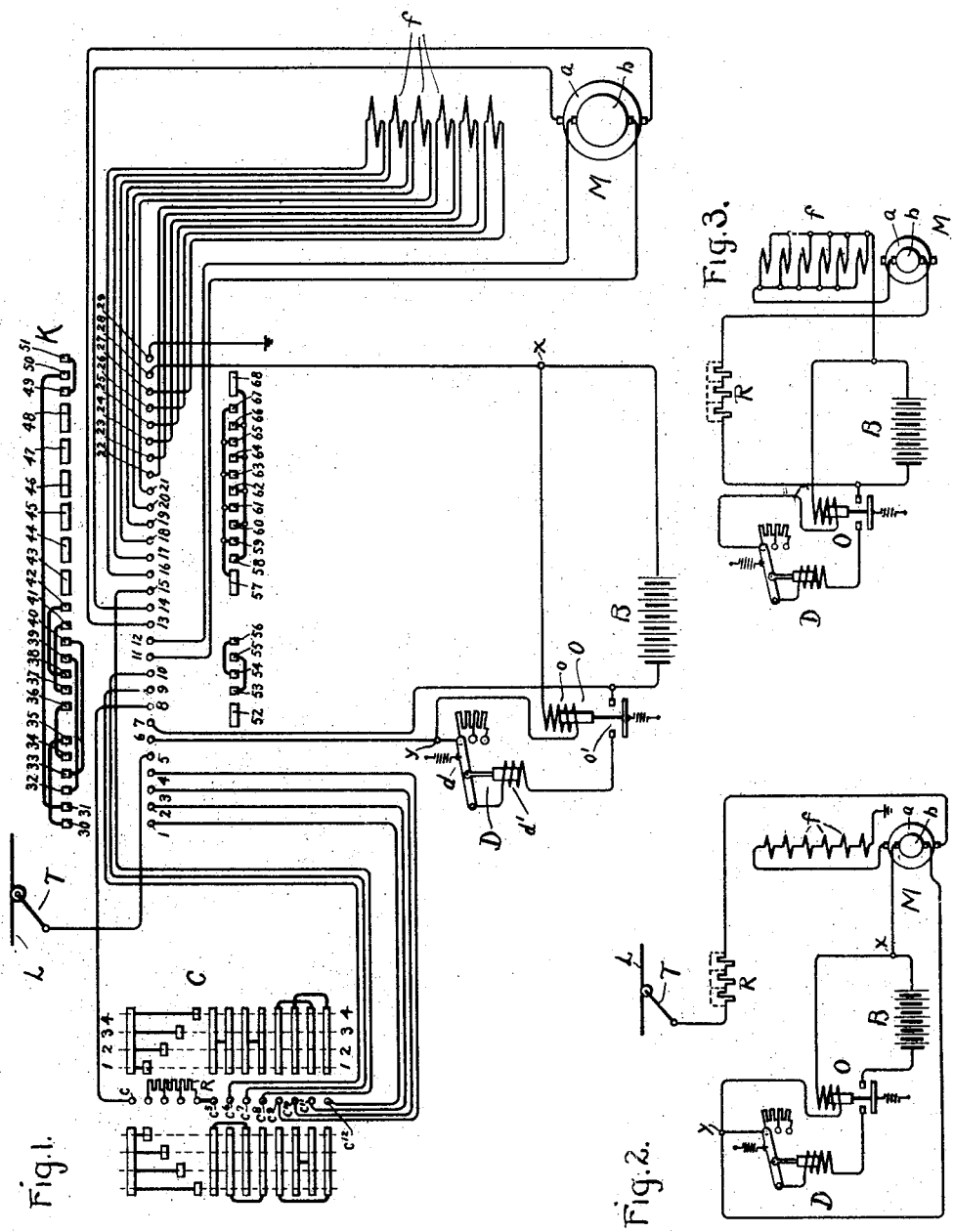
Witnesses
Inventor.
Alexander Churchward.
by
Atty.

UNITED STATES PATENT OFFICE.

ALEXANDER CHURCHWARD, OF SCHENECTADY, NEW YORK, ASSIGNOR TO GENERAL ELECTRIC COMPANY, A CORPORATION OF NEW YORK.

ELECTRIC TRACTION SYSTEM.

No. 851,799.      Specification of Letters Patent.      Patented April 30, 1907.

Application filed June 1, 1906. Serial No. 319,753.

*To all whom it may concern:*

Be it known that I, ALEXANDER CHURCHWARD, a citizen of the United States, residing at Schenectady, county of Schenectady, State of New York, have invented certain new and useful Improvements in Electric Traction Systems, of which the following is a specification.

In transportation systems known as "trackless trolley" systems, wherein an electrically-propelled vehicle running in the ordinary roadway receives current from an overhead trolley, it is desirable to provide flexibility of operation such that the vehicle may leave the road adjacent which the trolley wire is situated and travel through roads branching from the main road.

The object of the present invention is to provide means whereby such vehicles may be made to operate satisfactorily either when receiving current from the trolley or when operating on branch roads on which there are no trolleys.

To the above end the present invention contemplates the use of a motor apparatus on the vehicle arranged to propel the vehicle while operating on current received from an external source of supply and, during such operation, to charge a local source of supply, such as storage battery; and thereafter to operate on current supplied from the storage battery to propel the vehicle independently of the external source of supply. The particular arrangement of parts employed will of course vary greatly to meet different conditions, but where the voltage of the external source is high, as for example, where the vehicle is adapted to take current from a street railway trolley wire, or other trolley wire carrying current at a similar potential, the motor apparatus should preferably be designed to operate on the high voltage of the external source and on a much lower storage battery voltage; since ordinarily it would not be practicable to have a storage battery whose voltage is as high as the voltage in street railway systems. Therefore, in one of its forms, the present invention employs a motor having two separate armature windings and two commutators, together with common field windings for the armature windings, which field windings are connected in series when operating on high potential current and in parallel when operating on low potential current; one of the armature windings receiving current only from the external source and the other armature winding either receiving current from or supplying current to the storage battery.

My invention comprises further features of construction and organization of parts to be hereinafter described and particularly pointed out in the claims.

In the accompanying drawing I have illustrated a preferred form of the present invention adapted to systems employing a high external voltage and a much lower storage battery voltage.

In said drawings: Figure 1 shows diagrammatically the entire equipment of one vehicle; Fig. 2 shows diagrammatically the main circuits when the vehicle is operating on current received from the external source; and Fig. 3 is a diagram of connections when the vehicle is operating on current supplied from the storage battery.

Referring to the drawing, M indicates a motor having armature windings $a$ and $b$ and a plurality of field windings $f$.

L is a source of current supply external to the vehicle, such as a trolley wire.

T is a current collector carried by the vehicle and adapted to receive current from the trolley wire.

B is a storage battery on the vehicle.

C is a main controller.

K is a commutating switch arranged to connect the controller and motor either to the current collector or to the storage battery.

The controller is illustrated as a reversing controller of the ordinary rheostatic type. The commutating switch has two running positions, namely, that position wherein the upper row of rectangular contacts engages with the row of circular contacts, and the other position wherein the lower row of rectangular contacts engages with the circular contacts. In the first position the vehicle is adapted to be propelled from current supplied by the external source and in the other position the propelling current is obtained from the storage battery.

Assuming that it is desired to operate the vehicle along the main road adjacent which the trolley wire is situated: the commutating switch is operated so as to bring the upper row of movable contacts into engagement with the fixed contacts; and then, upon turning the controller to its first forward running position wherein the movable contacts engage with the fixed contacts along line 1—1, a circuit may be traced from current collector T to contact 5, of the commutating switch, through contacts 34, 36, and 8, to contact $c$ of the controller, movable contacts of the controller, through resistance R, contact $c^5$, movable contact of the controller, contact $c^6$, contacts 9, 37, 41, and 13, through the armature winding $a$, contacts 14, 42, 38, and 10, contact $c^7$, movable controller contacts, contact $c^8$, contacts 15, 43, and 16, through the upper section $f$ of the field windings, through contacts 17, 44, and 18, through the second section of field windings and thus by way of contacts 19 to 27 and 45 to 49, and contacts 51 and 29, through the remainder of the sections of the field windings in series with each other, to ground. The armature winding $a$ is therefore connected in series with the field windings, all of which are connected in series with each other, and current is supplied to these elements from the trolley wire through the resistance R. Upon turning the controller successively through its second, third and fourth running positions, the resistance is cut out step-by-step, so that finally the armature winding $a$ and the field windings are left connected directly across the line. A further circuit may be traced from the upper terminal of armature $b$, through contacts 12, 40, 33 and 4, to contact $c^9$, movable controller contacts, contact $c^{11}$, to contacts 2, 31, 50 and 28, to the point $x$, and thence through the coil $o$ of a relay O to a point $y$, through contacts 6, 35, 30, and 1, through contacts $c^{12}$, movable controller contacts, contact $c^{10}$, through contacts 3, 32, 39 and 11, to the lower terminal of armature winding $b$. The contacts $o^1$ of the relay, it will be seen, complete a circuit between the point $x$ and $y$ in in shunt to the relay coil; this circuit including the storage battery and, if desired, a controlling device D. The relay is so adjusted that the current passing through it is insufficient to operate it until the vehicle has reached such a speed that the voltage of armature winding $b$ is sufficiently high to cause a charging current to flow into the battery. As soon as the proper voltage is reached, the relay closes its contacts and current flows from the armature winding $b$, through the circuit previously traced, except that between $x$ and $y$ the current divides, a portion passing through the coil of the relay and the remainder going through the storage battery. The controlling device D is for the purpose of cutting down the charging current and consists of a rheostat $d$, and an operating electromagnet whose coil $d^1$ is in series with the battery. The arrangement is such that when the charging current becomes too large resistance is cut in and the current diminished.

In Fig. 2 I have shown the various motor and battery connections when current is being received from the outside source; the vehicle being assumed to be running at a speed so low that the battery is disconnected from the armature winding $b$. Upon leaving the main road for a side street or a branch road along which there is no trolley wire, the commutating switch is moved into its other running position. The contacts 1 to 5, inclusive, and 13 and 14, are now idle, so that armature winding $a$ is entirely cut out and the current collector T is disconnected. Similarly, the circuit through the relay coil $o$ is interrupted at contact 6, so that the relay and the device D remain inoperative. Assuming the controller C to be again in its first running position, a circuit may be traced from the left-hand terminal of battery B, through contacts 7, 52 and 8, through contact $c$, movable controller contacts, resistance R, contact $c^5$, movable controller contacts, contact $c^6$, through contacts 9, 53, 55, 11, armature winding $b$, contacts 12, 56, 54, 10, contact $c^7$, movable contacts of the controller, contact $c^8$, contacts 15 and 57, and thence by means of contacts 16 to 28 and 58 to 68, through the several sections of the field winding in parallel, to the right-hand terminal of the battery. Thus it will be seen that the armature winding $b$ is connected in series with the several sections of the field winding connected in parallel with each other, the whole being supplied with current from the battery through the resistance R. By turning the controller through its second, third and fourth positions the resistance R is cut out step-by-step and the motor is left connected directly across the battery. The operative motor circuit, together with the idle relay circuit, during operation on current supplied by the storage battery, is indicated in Fig. 3.

The leads from the terminals of both armature windings pass through the controller C and the contacts of the controller are so arranged that when the controller is moved toward the right instead of toward the left, the connections of these armature windings to the remainder of the system is reversed, whereby the proper circuit conditions are always maintained either for forward or reverse operation.

It will be seen that the storage battery is made to do only a minimum amount of work since the field of the motor is excited by current received from the external source when the vehicle is running along the main road and the storage battery is employed for this purpose only when no other current is available. By arranging the commutating switch as shown, there is no danger of damage resulting by bringing the current collector into engagement with the external source while the vehicle is being operated from the storage battery, since the storage battery is at all times entirely disconnected from the current collector.

Although I have illustrated and described my invention as embodied in a preferred form for use under certain conditions, I do not desire to be limited to the particular arrangement of parts shown, except as specifically indicated in the appended claims, since in its broader aspects the invention may take various forms and in the claims I intend covering all such forms.

What I claim as new and desire to secure by Letters Patent of the United States, is,—

1. In an electric traction system, a vehicle, a source of current supply external to the vehicle, a source of current supply on said vehicle, a dynamo-electric machine for propelling said vehicle having two armature windings and a field winding, and means for connecting one of said armature windings and said field winding to one of said sources and for connecting the other armature winding and said field winding to the other source.

2. In an electric traction system, a vehicle, a source of current supply external to the vehicle, a source of current supply on said vehicle, a dynamo-electric machine for propelling said vehicle having two armature windings and a field winding, and means for connecting one of said armature windings and said field winding to the external source of current supply and the other armature winding to the other source and for disconnecting the first armature winding and the field winding from the external source and connecting the other armature winding and the field winding to the other source.

3. In an electric traction system, a vehicle, a source of current supply external to the vehicle, a source of current supply on said vehicle, a propelling dynamo-electric machine for said vehicle having two armature windings and a plurality of field windings, and means for connecting one of said armature windings and the field windings arranged in series to one of said sources and for connecting the other armature winding and the field windings arranged in parallel to the other source.

4. In an electric traction system, a vehicle, a source of current supply external to the vehicle, a storage battery on the vehicle, a propelling dynamo-electric machine on said vehicle having two armature windings and a plurality of field windings, and means for connecting one of said armature windings and the field windings arranged in series to said external source and for connecting the other armature winding and the field windings arranged in parallel to the storage battery.

5. In an electric traction system, a vehicle, a source of current supply external to the vehicle, a storage battery on the vehicle, a propelling dynamo-electric machine on said vehicle having two armature windings and a plurality of field windings, and means for connecting one of said armature windings and the field windings arranged in series to the external source and the other armature winding to the storage battery and for disconnecting the first armature winding and the field windings from the external source and connecting the other armature winding and the field windings arranged in parallel to the battery.

6. In an electric traction system, a vehicle, a source of current supply external to the vehicle, a source of current supply on the vehicle, a propelling dynamo-electric machine on the vehicle having two armature windings and one set of field windings, and means for energizing the field windings and one armature winding from one source or the field windings and the other armature winding from the other source in order to propel the vehicle.

7. In an electric traction system, a vehicle, a source of current supply external to the vehicle, a storage battery on the vehicle, a propelling dynamo-electric machine on the vehicle having two armature windings and a plurality of field windings, and means for arranging the field windings in one relation toward each other and energizing them and one armature winding from the external source or for arranging the field windings in other relations toward each other and energizing them and the other armature winding from the storage battery.

8. In an electric traction system, a vehicle, a source of current supply external to the vehicle, a storage battery on the vehicle, a propelling dynamo-electric machine on said vehicle having two armature windings and one set of field windings, means for energizing said field windings and one of said armature windings from the external source of current supply or for energizing the other armature winding and the field windings from the storage battery in order to propel the vehicle, and means for automatically connecting one armature winding to the storage battery upon predetermined voltage in that winding when the other armature winding and the field windings are energized from the external source.

9. In an electric traction system, a vehicle, a source of current supply external to the vehicle, a storage battery on said vehicle, a propelling dynamo-electric machine on said vehicle having two armature windings and one set of field windings, and means for connecting one of said armature windings to the storage battery in series with the field windings arranged in parallel or for connecting the other armature winding to the external source of supply in series with the field windings arranged in series.

10. In an electric traction system, a vehicle, a source of current supply external to the vehicle, a storage battery on said vehicle, a resistance, a propelling dynamo-electric machine on said vehicle having two armature windings and one set of field windings, and means for connecting one of said armature windings to the storage battery in series with the field windings arranged in parallel or for connecting the other armature winding to the external source of supply in series with the field winding arranged in series, said means including a controller for connecting said resistance in circuit with either armature winding and gradually eliminating the resistance.

11. In an electric traction system, a vehicle, a source of current supply external to the vehicle, a storage battery on said vehicle, a propelling dynamo-electric machine on said vehicle having two armature windings and one set of field windings, means for connecting one of said armature windings to the storage battery in series with the field windings arranged in parallel or for connecting the other armature winding to the external source of supply in series with the field windings arranged in series, and means for automatically connecting one of said armature windings to the battery upon a predetermined voltage in that armature when the other armature is connected to the external source.

12. In combination, a dynamo-electric machine having two armature windings and one set of field windings, two sources of current supply, and means for energizing one of said armature windings and the field windings from one of said sources or for energizing the other armature winding and the field windings from the other source in order to cause said machine to operate.

13. In combination, a dynamo-electric machine having two armature windings and one set of field windings, two sources of current supply one of which is a storage battery, means for energizing one of said armature windings and the field windings from one of said sources or for energizing the other armature winding and the field windings from the other source in order to cause the machine to operate, and means for causing the one armature winding to be automatically connected to said storage battery at a predetermined voltage in that armature winding in order to charge the battery when the other armature winding and the field windings are being energized from the other source.

14. In an electric traction system, a vehicle, a source of current supply external to the vehicle, a storage battery on said vehicle, a resistance, a propelling dynamo-electric machine on said vehicle having two armature windings and one set of field windings, means for connecting one of said armature windings to the storage battery in series with the field windings arranged in parallel or for connecting the other armature winding to the external source of supply in series with the field winding arranged in series, said means including a controller for connecting said resistance in circuit with either armature winding and gradually eliminating the resistance, and means for automatically controlling the value of the current in the battery circuit during the charging of the battery.

15. In combination, a dynamo-electric machine having two armature windings and one set of field windings, a resistance, two sources of current supply, and means for energizing one of said armature windings and the field windings from one of said sources or for energizing the other armature winding and the field windings from the other source to cause said machine to operate, said means including a controller arranged to connect said resistance in circuit with either armature winding and to eliminate the resistance step by step.

16. In combination, a dynamo-electric machine having two armature windings and one set of field windings, two sources of current supply, and means for connecting one armature in series with the field windings to one of said sources and for connecting the other armature winding in series with the field windings to the other of said sources.

17. In combination, a dynamo-electric machine having two armature windings and one set of field windings, two sources of current supply one of which is a storage battery, and means for connecting one of said armature windings to the storage battery in series with the field windings arranged in parallel or for connecting the other armature winding to the other source of current supply in series with the field windings connected in series.

18. In an electric traction system, a vehicle, a source of supply external to the vehicle, a storage battery on the vehicle, a dynamo-electric machine on the vehicle having two armature windings and a single field winding, means for connecting one of said armature windings and the field winding in series with each other to the external source of supply to operate the vehicle, and connections from the other armature winding to the terminals of the storage battery for charging the battery while the vehicle is being propelled from the external source of current.

19. In an electric traction system, a vehicle, a source of current supply external to the vehicle, a storage battery on the vehicle, a dynamo-electric machine on the vehicle having two armature windings and a single field winding, means for connecting one of the armature windings in series with the field winding to the external source of current supply for propelling the vehicle, connections between the other armature winding and the storage battery for charging the storage battery while the vehicle is being propelled from the external source of supply, and a relay for open-circuiting the storage battery when the potential of the second armature winding falls below a predetermined value.

In witness whereof, I have hereunto set my hand this 31st day of May, 1906.

ALEXANDER CHURCHWARD.

Witnesses:
BENJAMIN B. HULL,
HELEN ORFORD.